United States Patent
Johnson et al.

(10) Patent No.: US 12,176,523 B2
(45) Date of Patent: Dec. 24, 2024

(54) LEAD-LEAD OXIDE-CARBON NANOCOMPOSITE FOR ENERGY STORAGE CELLS AND METHOD OF PREPARATION

(71) Applicant: UCHICAGO ARGONNE, LLC, Chicago, IL (US)

(72) Inventors: Christopher S. Johnson, Naperville, IL (US); Eungje Lee, Naperville, IL (US); Jinhyup Han, Woodridge, IL (US); Jehee Park, Woodridge, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 119 days.

(21) Appl. No.: 18/096,768

(22) Filed: Jan. 13, 2023

(65) Prior Publication Data

US 2023/0197933 A1    Jun. 22, 2023

Related U.S. Application Data

(62) Division of application No. 16/853,988, filed on Apr. 21, 2020, now Pat. No. 11,611,069.

(51) Int. Cl.
| | |
|---|---|
| *H01M 4/36* | (2006.01) |
| *H01M 4/57* | (2006.01) |
| *H01M 4/587* | (2010.01) |
| *H01M 10/0525* | (2010.01) |
| *H01M 10/054* | (2010.01) |

(52) U.S. Cl.
CPC ............ *H01M 4/364* (2013.01); *H01M 4/57* (2013.01); *H01M 4/587* (2013.01); *H01M 10/0525* (2013.01); *H01M 10/054* (2013.01)

(58) Field of Classification Search
None
See application file for complete search history.

(56) References Cited

U.S. PATENT DOCUMENTS 8,999,581 B2    4/2015 Lee et al.

OTHER PUBLICATIONS

Hamel, C., Brousse, T., Belanger, D., Guay, D.—Effect of Ball-milling on the Physical and Electrochemical Properties of Lead Dioxide , ECS Transactions, 16(24) pp. 213-220, 2009 (Year: 2009).*
Wang. J., Hou, H., Hu, J., Wu, X., Hu, Y., Li, M., Yu, W., Zhang, P., Liang, S., Xiao, K., Kumar, R.S., Yang, J.—Mechano-chemical synthesis of high-stable PbO@C composite for enhanced performance of lead-carbon battery, Electrochimica Acta, 299 (2019) pp. 682-691 (Year: 2019).*
Ellis, L.D et al., In-Situ XRD Study of Silicon, Lead and Bismuth Negative Electrodes in Nonaqueous Sodium Cells, Journal of The Electrochemical Society 161 (3), A416-A421 (2014).
Jow et al., (Eds.) Electrolytes For Lithium and Lithium-Ion Batteries; Chapter 1, pp. 1-92; Springer; New York, NY (2014).
Jow et al., (Eds.) Electrolytes For Lithium and Lithium-Ion Batteries; Chapter 2, pp. 93-166; Springer; New York, NY (2014).
Jow et al., (Eds.) Electrolytes For Lithium and Lithium-Ion Batteries; Chapter 3, pp. 167-182; Springer; New York, NY (2014).
Jow et al., (Eds.) Electrolytes For Lithium and Lithium-Ion Batteries; Chapter 4, pp. 209-266; Springer; New York, NY (2014).
Khoa, H.X et al., Planetary Ball Mill Process in Aspect of Milling Energy, Journal of Korean Powder Metallurgy Institute 21 (2), 155-164 (2014).
Long, B.R et al., Enabling High-Energy, High-Voltage Lithium-Ion Cells: Standardization of Coin-Cell Assembly, Electrochemical Testing, and Evaluation of Full Cells, Journal of The Electrochemical Society 163 (14) A2999-A3009 (2016).
Martos, M et al., Lead-Based Systems As Suitable Anode Materials Ffor Li-Ion Batteries, Electrochimica Acta 48, 615-621 (2003).
Obrovac, M.N et al., Alloy Negative Electrodes for Li-Ion Batteries, Chemical Reviews 114, 11444-11502 (2014).
Yadav, T.P et al., Mechanical Milling: A Top Down Approach For The Synthesis of Nanomaterials And Nanocomposites, Nanoscience and Nanotechnology 2 (3), 22-48 (2012).
Zhu, W et al., Application Of Operando X-Ray Diffraction and Raman Spectroscopies in Elucidating the Behavior of Cathode in Lithium-Ion Batteries, Frontiers In Energy Research 6 (66), 1-16 (2018).
Wang, H et al., A Facile Route for PbO@C Nanocomposites: An Electrode Candidate For Lead-Acid Batteries With Enhanced Capacitance, Journal of Power Sources 224, 125-131 (2013).
Gao, Y et al., BotryoidalPb/PbO@C Nanocomposite Derived From Eggpant Biomass as Negative Electrode Additives for Long-Cyclability Lead-Acid Batteries, Materials Chemistry and Physics 207, 123757, 1-7 (2021).
Hu, Y., et al., Synthesis of Nanostructured PbO@C Composite Derived from Spent Lead-Acid Battery for Next-Generation Lead-Carbon Battery, Advaned Functional Materials 28, 1705294, 1-9 (2018).
Huang, X., Ordered-Mesoporous-Carbon-Confined Pb/PbO Composites: Superior Electrocatalysts for CO2 Reduction, Chem Sus Chem. 13, 6346-6352 (2020).
Fang, Y., A Low-Concentration Hydrothermal Synthesis of Biocompatible Ordered Mesoporous Carbon Nanospheres with Tunable and Uniform Size, Angew. Chem. Int. Ed. 49, 7987-7991 (2010).

* cited by examiner

*Primary Examiner* — Anca Eoff
(74) *Attorney, Agent, or Firm* — Olson & Cepuritis, Ltd.

(57) ABSTRACT

Lead/lead oxide/carbon ("Pb—O—C") nanocomposite materials that are useful as electrode active materials for electrodes in lithium and sodium batteries are formed by grinding a mixture of a lead oxide material and a carbon material in a high energy ball mill. A Pb—O—C nanocomposite as described herein comprises Pb and lead oxide nanoparticles homogeneously dispersed in a carbon nanoparticle matrix. In the nanocomposite, other elements (e.g., transition metals, Al, Si, P, Sn, Sb, and Bi) can be alloyed with the Pb nanoparticles, incorporated as a mixed oxide with the lead oxide nanoparticles, or can be present as distinct elemental or oxide nanoparticles within the carbon nanoparticle matrix.

20 Claims, 6 Drawing Sheets

LEAD-LEAD OXIDE-CARBON NANOCOMPOSITE FOR ENERGY STORAGE CELLS AND METHOD OF PREPARATION

CROSS-REFERENCE TO RELATED APPLICATIONS

This application is a division of U.S. application Ser. No. 16/853,988, filed on Apr. 21, 2020, which is incorporated herein by reference in its entirety.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to nanocomposite materials comprising lead, oxygen, and carbon. More particularly, this invention relates to nanocomposite materials comprising nanoparticles of metallic lead and lead oxide dispersed in a matrix of carbon nanoparticles, e.g., nanoparticles in which the metallic lead is surrounded by a shell of lead oxide, and to a method of preparing such nanocomposite materials.

BACKGROUND

Advanced Li-ion and Na-ion batteries that can deliver high energies and capacities require new high-performance anodes. Anode materials that undergo alloying and conversion-type electrochemical reactions have been studied as alternative electrodes to graphite and hard carbon with the promise of higher capacities, and potentially higher energy densities. Lead (Pb) and lead oxides ("PbOx", e.g., PbO, $PbO_2$, $Pb_3O_4$, and mixtures thereof) have potential advantages of low cost and high volumetric energy density for rechargeable battery applications. In fact when the Argonne BATPAC model (see the anl(dot)gov/cse/batpac-model-software website page) is used with Pb as anode, and layered sodium transition metal oxide as cathode the calculated energy density for a sodium-ion pouch cell design is 549 Wh/L, and the cost is projected quite low at 63.5 USD/kWh. These metrics are certainly competitive with many grid storage battery systems; however, lead toxicity is a concern. On the plus side, Pb is one of the most recycled materials in the world, with a high recycling rate close to 99% in the United States. With the rapid progress of in-line lithium- and sodium-ion battery recycling technologies, lead-based materials could become a viable contender for high-energy, low-cost anodes in the future if the performance can be improved and validated.

Another major concern with lead-based anodes (Pb anodes), however, is poor cycle stability due to large volume expansion and contraction during the alloying and conversion reactions. This problem has generally limited practical application of such Pb anode materials. For example, conventional Pb and PbOx electrodes show rapid capacity decay in lithium and sodium cells. Because of these problems, there is an ongoing need for new Pb and PbOx electrode materials. The materials and methods described herein address this need.

SUMMARY

Lead/lead oxide/carbon ("Pb—O—C") nanocomposite materials are described herein. The nanocomposites are useful as electrode active materials for electrodes (e.g., anodes) in lithium-ion and sodium-ion secondary electrochemical cells and batteries (also referred to herein for convenience as "lithium cells" and "sodium cells"). A Pb—O—C nanocomposite as described herein comprises Pb and PbOx nanoparticles and/or cores of lead (Pb) encapsulated in lead-oxide (PbOx) shells (also referred to as "shell on core PbOx@Pb"), homogeneously dispersed in a carbon nanoparticle matrix. Optionally, one or more other elements can be incorporated in the nanocomposite. The other element or elements (e.g., transition metals, Al, Si, P, Sn, Sb, and Bi) can be alloyed with the Pb nanoparticles, incorporated as a mixed oxide with the PbOx nanoparticles, or can be present as distinct elemental or oxide nanoparticles within the carbon nanoparticle matrix. In some embodiments, the additional element or elements are present as alloys and mixed oxides with the Pb materials and as distinct elemental and/or oxide nanoparticles.

The nanocomposites can be prepared by a high-energy ball milling process. The process comprises grinding a mixture of a lead oxide material (e.g., PbO, $PbO_2$, $Pb_3O_4$, and the like) and a carbon material (e.g., carbon black, hard carbon, or graphite) together in a high-energy ball mill loaded at room temperature, under an inert atmosphere. During high-energy ball milling, PbOx reacts with carbon to undergo a redox reaction producing elemental Pb and carbon dioxide. The energy provided by the milling and vibration is great enough to induce the reduction-oxidation reaction. The ball milling is continued until the starting lead oxide and carbon materials are pulverized a homogeneous dispersion of the resulting Pb nanoparticles and PbOx nanoparticles within a matrix of carbon nanoparticles forms. Typically, this process can take several hours (e.g., 1 to 12 hours). Optionally, heat-treatment at a temperature of about 30° C. to about 200° C. in air can be applied to the ball-milled product to form a PbOx passive layer on the surface of the Pb nanoparticles. In this manner, a PbOx@Pb shell on core nanoparticle is formed.

One or more additional element can be incorporated in the nanocomposite by combining a material comprising the other element or elements (e.g., an element or elements such as transition metals, Al, Si, P, Sn, Sb, and Bi) with the PbOx and carbon materials during the grinding process. In such cases, these materials may also be referred to herein as Pb—O—C nanocomposites or as $Pb_yM_{1-y}$-O—C nanocomposites, where M refers to the one or more additional elements included in the material, and $0<y<1$, more typically $0.5<y<1$, and preferably $0.5<y<0.8$. The other materials can be added in elemental form, as an oxide, as a salt, or in any other form, and then can undergo redox reactions with the carbon and/or PbOx, and or alloying reactions with the Pb, depending on whether the material containing the element or elements are reactive with lead, carbon, and/or PbOx under the high-energy ball milling conditions.

Electrochemical data for Pb—O—C and $Pb_yM_{1-y}$-O—C nanocomposites described herein in lithium and sodium cells show higher reversible capacity and improved cycle stability compared to previously reported data for conventional lead and lead oxide materials.

The following non-limiting embodiments of the methods described herein are provided below to illustrate certain aspects and features of the compositions and methods described herein. Embodiment 1 is a lead-lead oxide-carbon (Pb—O—C) nanocomposite comprising nanoparticles of lead (Pb) and nanoparticles of a lead oxide (PbOx) homogeneously dispersed in a carbon nanoparticle matrix.

Embodiment 2 comprises the nanocomposite of embodiment 1, wherein the nanoparticles of Pb have a mean diameter of about 2 to about 20 nm as determined by electron microscopy.

Embodiment 3 comprises the nanocomposite of embodiment 1 or 2, wherein nanoparticles of the PbOx have a mean diameter of about 2 to about 20 nm as determined by electron microscopy.

Embodiment 4 comprises the nanocomposite of any one of embodiments 1 to 3, wherein the nanocomposite has a Pb:C elemental ratio of about 1:1 to about 1:20.

Embodiment 5 comprises the nanocomposite of any one of embodiments 1 to 4, wherein the nanoparticles of the PbOx have a Pb:O atomic ratio about 1:1 to about 1:2.

Embodiment 6 comprises the nanocomposite of any one of embodiments 1 to 5, wherein the Pb and the PbOx are present in the nanocomposite in a respective molar ratio of about 1:0.1 to about 0.1:1.

Embodiment 7 comprises the nanocomposite of any one of embodiments 1 to 6, wherein PbOx is present on the surface of at least some of the Pb nanoparticles forming a shell on core nanoparticle morphology.

Embodiment 8 comprises the nanocomposite of any one of embodiments 1 to 7, further comprising at least one additional element selected from the group consisting of a transition metal, Al, Si, P, Sn, Sb, and Bi.

Embodiment 9 comprises the nanocomposite of embodiment 8, wherein the at least one additional element is (a) incorporated within the nanoparticles of Pb, (b) incorporated as an oxide within the nanoparticles of PbOx, (c) dispersed within the carbon nanoparticle matrix as elemental nanoparticles, (d) dispersed within the carbon nanoparticle matrix as oxide nanoparticles, or (e) a combination of two or more of (a), (b), (c), and (d).

Embodiment 10 comprises the nanocomposite of embodiment 8 or 9, wherein the at least one additional element is selected from the group consisting of Mn, Ni, Fe, Sb, and Sn.

Embodiment 11 comprises the nanocomposite of any one of embodiments 8 to 10, wherein the at least one additional element comprises a combination of Sb and Sn, or a combination of Sb and Ni.

Embodiment 12 comprises the nanocomposite of any one of embodiments 8 to 11, wherein the at least one additional element is present in the nanocomposite at a concentration of about 50% to about 100% expressed as a percentage of the Pb in the nanocomposite.

Embodiment 13 comprises a method of preparing the nanocomposite of any one of embodiments 1 to 12 comprising grinding a mixture comprising a lead oxide material and a carbon material together in a high-energy ball mill under an inert atmosphere until a homogeneous dispersion of the nanoparticles of Pb and PbOx is formed within the carbon nanoparticle matrix.

Embodiment 14 comprises the method of embodiment 13, wherein the mixture of the lead oxide material and the carbon material further comprises one or more additional material comprising at least one additional element selected from the group consisting of a transition metal, Al, Si, P, Sn, Sb, and Bi.

Embodiment 15 comprises the method of embodiment 13 or 14, wherein the lead oxide material and the carbon material are initially present in the ball mill in a respective weight ratio of about 9:1 to about 1:1.

Embodiment 16 is an electrode for a lithium-ion or sodium-ion battery comprising the nanocomposite of any one of embodiments 1 to 12 coated on a conductive current collector with a binder.

Embodiment 17 comprises the electrode of embodiment 16, wherein the nanocomposite is coated on the conductive current collector at a loading of about 0.2 to about 1 g/m$^2$ (e.g., about 0.33 g/m$^2$).

Embodiment 18 is an electrochemical cell comprising a first electrode comprising a lead-lead oxide-carbon nanocomposite, a second electrode, an ion-conductive separator between the first electrode and the second electrode, and an electrolyte comprising a lithium salt or a sodium salt in a non-aqueous solvent at a concentration of about 0.1 to about 5 M contacting the first electrode, the second electrode, and the separator contacting the first electrode, the second electrode, and the separator, wherein the first electrode is the electrode of embodiment 16 or 17.

Embodiment 19 comprises the electrochemical cell of embodiment 18, wherein the electrolyte further comprises 1-fluoroethylene carbonate at a concentration of about 1 wt % to about 50 wt %.

Embodiment 20 is a battery comprising a plurality of the electrochemical cells of embodiment 18 or 19 electrically connected in series, in parallel, or in both series and parallel.

DETAILED DESCRIPTION

The Pb—O—C nanocomposite materials described herein are prepared by a high-energy ball milling process, which imparts unique structural and compositional properties to the resulting nanocomposite materials. High-energy ball milling induces chemical as well as physical changes to the milling mixture of PbOx and carbon. In particular, the PbOx and carbon undergo redox reactions where some carbon is oxidized and some PbOx is reduced to elemental Pb. At the same time, grinding of the initial PbOx and carbon powders in the high-energy ball mill reduces the particle size of the powders, intimately mixes the materials. The redox reactions result in the Pb and any remaining PbOx being embedded in a matrix of carbon nanoparticles. When an additional element or a compound (e.g., an oxide, a salt, an alloy, etc.) containing one or more additional elements is included in the mixture of PbOx and carbon, the other element can also undergo reactions with the carbon and the PbOx to incorporate the additional element or elements (M) into the resulting nanocomposite (e.g., as oxide nanoparticles, elemental nanoparticles, mixed PbM oxide nanoparticles, PbM alloys nanoparticles, and the like). The nanocomposites are useful as electrode active materials for electrodes (e.g., anodes) in lithium-ion and sodium-ion secondary electrochemical cells and batteries.

Typically, the carbon material utilized in the ball milling process is a form of carbon black. Alternatively, other forms of carbon such as hard carbon, graphite or activated carbon can be used. The carbon, in powdered form, is mixed with one or more form of PbOx, such as PbO, $PbO_2$, and $Pb_3O_4$ in a weight ratio of PbOx to carbon of about 5:5 to about 9:1, preferably about 6:4 to about 8:2 (e.g., about 7:3). Powders are loaded into ball mill at room temperature under an inert gas (e.g., Ar), and then ball milled with no externally provided heating for about 1 to about 12 hours, preferably about 3 to about 9 hours.

The high-energy milling generally results in a product with nanoparticles of Pb and nanoparticles of a PbOx homogeneously dispersed in a carbon nanoparticle matrix. The nanoparticles of Pb typically have a mean diameter of about 2 to about 20 nm; the nanoparticles of the PbOx typically have a mean diameter of about 2 to about 20 nm; and the carbon nanoparticles typically have a particle size of about 10 to about 200 nm, as determined by electron microscopy. The nanocomposite has a Pb:C elemental ratio of about 1:1 to about 1:20; and the nanoparticles of the PbOx typically have a Pb:O atomic ratio of about 1:1 to about 1:2 (e.g., about 1:1). The Pb and the PbOx are typically present in the nanocomposite in a respective molar ratio of about 9:1 to about 1:1.

When it is desired to include one or more elements, M, other than Pb, O or C (e.g., M=Al, Si, P, Sn, Sb, Bi, and/or transition metal such as Ni) into the nanocomposite, an additional material comprising M is included in the mixture of PbOx and C prior to high-energy ball milling. The material that includes the additional element generally is included in the mixture for grinding at a concentration of about 25% to about 50% expressed as a percentage of the Pb in the nanocomposite.

High-energy ball milling has been known since at least the late 1960's and has been described as a process in which a powder mixture is subjected to high-energy collisions from the balls inside of a sealed container. The container, which contains a sample and one or more balls, is shaken in a complex motion that combines back-and-forth swings, lateral movements, with high frequency, low amplitude vibrations, and sometimes also describing a figure-8 motion. Strong G-forces develop in the container due to both the motion of the container, and the motions of the grinding ball in the container with the material to be ground. High-energy ball milling can reduce even very hard materials to very fine particles, and even to nano-sized particles for some materials. In fact, the energy input into the materials being ground is high enough to induce chemical reactions within some materials. Because of this, the process is generally performed under an inert atmosphere. High-energy ball milling has been used to form alloys between various metals and other materials, and accordingly is sometimes referred to as mechanical alloying. In the case of the carbon and PbOx materials described herein, the energy imparted to the materials during the grinding process induces redox reactions between the carbon, the PbOx and any other materials that are present during the grinding process.

Equipment for high-energy ball milling also is well known, such as the RETSCH EMAX and PM 400 mills, and the SPEX model 8000 shaker mill. High energy ball milling and equipment therefor are described in Yadof, et al. *Nanoscience and Nanotechnology*, 2012; 2(3): 22-48, which is incorporated herein by reference in its entirety.

In electrochemical cell and battery embodiments described herein, the electrolyte comprises an electrolyte salt (e.g., an electrochemically stable lithium salt or a sodium salt) dissolved in a non-aqueous solvent. Any lithium electrolyte salt can be utilized in the electrolyte compositions for lithium electrochemical cells and batteries described herein, such as the salts described in Jow et al. (Eds.), *Electrolytes for Lithium and Lithium-ion Batteries*; Chapter 1, pp. 1-92; Springer; New York, NY (2014), which is incorporated herein by reference in its entirety.

Non-limiting examples of lithium salts include, e.g., lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate ($LiClO_4$), lithium bis(oxalato)borate ($LiB(C_2O_4)_2$ or "LiBOB"), lithium difluoro(oxalato)borate ($LiF_2BC_2O_4$ or "LiDFOB"), lithium tetrafluoroborate ($LiBF_4$), lithium hexafluorophosphate ($LiPF_6$), lithium hexafluoroarsenate ($LiAsF_6$), lithium thiocyanate (LiSCN), lithium bis(fluorosulfonyl)imidate (LiFSI), lithium bis(pentafluoroethylsulfonyl)imidate (LiBETI), lithium tetracyanoborate ($LiB(CN)_4$), lithium nitrate, combinations of two or more thereof, and the like. The lithium salt can be present in the electrolyte solvent at any concentration suitable for lithium battery applications, which concentrations are well known in the secondary battery art. As used herein the term "lithium battery" refers to electrochemical cells and combinations of electrochemical cells in which lithium (e.g., lithium ion) shuttles between an anode and a cathode, and includes so-called full cells with an anode material (e.g., graphite) that can accommodate intercalated lithium ions, as well as so-called half-cells in which the anode is lithium metal. In some embodiments, the lithium salt is present in the electrolyte at a concentration in the range of about 0.1 M to about 5 M, e.g., about 0.5 M to 2 M, or 1 M to 1.5M. A preferred lithium salt is $LiPF_6$.

For sodium electrolytes, sodium salts of the same anions as the lithium electrolyte salts described above can be utilized, such as, e.g., sodium bis(trifluoromethanesulfonyl) imidate (NaTFSI), sodium 2-trifluoromethyl-4,5-dicyanoimidazolate (NaTDI), sodium 4,5-dicyano-1,2,3-triazolate, sodium trifluoromethanesulfonate, sodium perchlorate, sodium bis(oxalato)borate, sodium difluoro(oxalato)borate, sodium tetrafluoroborate ($NaBF_4$), sodium hexafluorophosphate ($NaPF_6$), sodium hexafluoroarsenate, sodium thiocyanate (NaSCN), sodium bis(fluorosulfonyl)imidate (NaF SI), sodium bis(pentafluoroethylsulfonyl)imidate), sodium tetracyanoborate, sodium nitrate, combinations of two or more thereof, and the like.

The non-aqueous solvent for the electrolyte compositions include the solvents described in Jow et al. (Eds.), *Electrolytes for Lithium and Lithium-ion Batteries*; Chapter 2, pp. 93-166; Springer; New York, NY (2014), which is incorporated herein by reference in its entirety. Non-limiting examples of solvents for use in the electrolytes include, e.g., an ether, a carbonate ester (e.g., a dialkyl carbonate or a cyclic alkylene carbonate), a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. For example, the solvent can comprise an ether (e.g., glyme or diglyme), a linear dialkyl carbonate (e.g., dimethyl carbonate (DMC), diethyl carbonate (DEC), ethyl methyl carbonate (EMC) and the like), a cyclic alkylene carbonate (ethylene carbonate (EC), propylene carbonate (PC) and the like), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate, a fluoro-substituted sulfolane, and a fluoro-substituted sulfone. The solvent can comprise a single solvent compound or a mixture of two or more solvent compounds.

In some embodiments, the non-aqueous solvent for a lithium electrochemical cell as described herein can be an ionic liquid. Any electrochemically stable ionic liquid solvent can be utilized in the electrolytes described herein, such as the solvents described in Jow et al. (Eds.), *Electrolytes for Lithium and Lithium-ion Batteries*; Chapter 4, pp. 209-226; Springer; New York, NY (2014), which is incorporated herein by reference in its entirety. In the case of lithium electrochemical cells and batteries, the ionic liquid can optionally include a lithium cation, and can act directly as the electrolyte salt. Similarly, in the case of sodium electrochemical cells and batteries, the ionic liquid can optionally include a sodium cation, and can act directly as the electrolyte salt.

The electrolyte compositions for lithium and sodium electrochemical cells and batteries described herein also can optionally comprise an additive such as those described in Jow et al. (Eds.), *Electrolytes for Lithium and Lithium-ion Batteries*; Chapter 3, pp. 167-182; Springer; New York, NY (2014), which is incorporated herein by reference in its entirety. Such additives can provide, e.g., benefits such as SEI, cathode protection, electrolyte salt stabilization, thermal stability, safety enhancement, overpotential protection, corrosion inhibition, and the like. The additive can be present in the electrolyte at any concentration, but in some embodiments is present at a concentration in the range of about 0.0001 M to about 0.5 M. In some embodiments, the additive is present in the electrolyte at a concentration in the range of about 0.001 M to about 0.25 M, or about 0.01 M to about 0.1 M. A preferred additive is 1-fluoroethylene carbonate (FEC), which preferably is included in the electrolyte at a concentration of about 1 to 50 wt %, more preferably about 2 to 20 wt %.

The nanocomposites described herein are useful as electrode active materials for in a lithium-ion or sodium-ion electrochemical cell. Such cells typically comprise a positive electrode (cathode), a negative electrode (anode) comprising the Pb—O—C nanocomposite as an anode active material (optionally in combination with a carbon material), and a porous separator between the cathode and anode, with the electrolyte in contact with both the anode and cathode, as is well known in the battery art. A battery can be formed by electrically connecting two or more such electrochemical cells in series, parallel, or a combination of series and parallel. The electrodes described herein preferably are utilized as the anode in a full-cell configuration in lithium-ion and sodium-ion cells and batteries. Electrochemical cells and battery designs and configurations, anode and cathode materials, as well as electrolyte salts, solvents and other battery or electrode components (e.g., separator membranes, current collectors), which can be used in the electrolytes, cells and batteries described herein, are well known in the secondary battery art, e.g., as described in "Lithium Batteries Science and Technology" Gholam-Abbas Nazri and Gianfranco Pistoia, Eds., Springer Science+Business Media, LLC; New York, NY (2009), which is incorporated herein by reference in its entirety.

Processes used for manufacturing lithium and sodium cells and batteries are well known in the art. The active electrode materials are coated on both sides of metal foil current collectors (typically copper for the anode and aluminum for the cathode) with suitable binders such as polyvinylidene difluoride and the like to aid in adhering the active materials to the current collectors. In the cells and batteries described herein, the anode active material is a Pb—O—C nanocomposite material described herein, which optionally can be utilized with a separate carbon material such as graphite, and the cathode active material typically is a lithium metal oxide material (for lithium cells and batteries) or a sodium metal oxide material (for sodium cells and batteries). Cell assembly typically is carried out on automated equipment. The first stage in the assembly process is to sandwich a separator between the anode. The cells can be constructed in a stacked structure for use in prismatic cells, or a spiral wound structure for use in cylindrical cells. The electrodes are connected to terminals and the resulting sub-assembly is inserted into a casing, which is then sealed, leaving an opening for filling the electrolyte into the cell. Next, the cell is filled with the electrolyte and sealed under moisture-free conditions.

Once the cell assembly is completed the cell typically is subjected to at least one controlled charge/discharge cycle to activate the electrode materials and in some cases form a solid electrolyte interface (SEI) layer on the anode. This is known as formation cycling. The formation cycling process is well known in the battery art and involves initially charging with a low voltage (e.g., substantially lower that the full-cell voltage) and gradually building up the voltage. The SEI acts as a passivating layer which is essential for moderating the charging process under normal use. The formation cycling can be carried out, for example, according to the procedure described in Long et al. *J. Electrochem. Soc.*, 2016; 163 (14): A2999-A3009, which is incorporated herein by reference in its entirety. This procedure involves a 1.5 V tap charge for 15 minutes at C/3 current limit, followed by a 6-hour rest period, and then 4 cycles at C/10 current limit, with a current cutoff (i≤0.05 C) at the top of each charge.

Electrodes comprising the Pb—O—C nanocomposite described herein, can be utilized with any combination of cathode and electrolyte in any type of rechargeable battery system that utilizes a non-aqueous electrolyte. In some lithium battery embodiments, the cathode active material can comprise a layered lithium metal oxide cathode material such as $LiMO_2$ wherein M=Mn, Ni, Co or a combination thereof (e.g., a layered lithium nickel-manganese-cobalt oxide such as $LiNi_{0.5}Mn_{0.3}Co_{0.2}O_2$ (also known as "NMC532"), $LiNi_{0.6}Mn_{0.2}Co_{0.2}O_2$ (also known as "NMC622"), and similar materials). In other embodiments, the cathode can comprise a spinel lithium metal oxide such as $LiM'_2O_4$ wherein M'=Mn, Ni, Co or a combination thereof; a structurally integrated 'layered-layered' (LL) lithium metal oxide such as $xLi_2MnO_3 \cdot (1-x)LiMn_yM_{1-y}O_2$ wherein 0<x<1, 0≤y≤1, M=Ni, Co, or Ni and Co; a structurally integrated 'layered-spinel' (LS) lithium metal oxide such as $xLi_2MnO_3 \cdot (1-x)Li_2Mn_yM_{2-y}O_4$ wherein 0<x<1, 0<y<2, M=Ni, Co, or Ni and Co; a structurally integrated 'layered-layered-spinel' (LLS) lithium metal oxide such as $z[xLi_2MnO_3 \cdot Li_2Mn_yM_{2-y}O_4] \cdot (1-z)Li_2M'_2O_4$ wherein 0<x<1, 0≤y≤1, 0<z<1, M=Ni, Co, or Ni and Co, and M'=Mn, Ni, Co or a combination thereof (e.g., 0.85 [$0.25Li_2MnO_3 \cdot (0.75)LiMn_{0.375}Ni_{0.375}Co_{0.25}O_2$] $\cdot 0.15LiM'_2O_4$ wherein M'=a combination Mn, Ni, and Co); or any other cathode active material used in lithium-ion batteries.

In some sodium battery embodiments, the cathode active can be sodium metal oxide materials such as layered transition metal oxides (e.g., $NaMO_2$ (M=Co, Mn), $Na_{0.67}Fe_{0.5}Mn_{0.5}O_2$, $Na_{0.76}Fe_{0.1}Mn_{0.5}Ni_{0.3}Mg_{0.1}O_2$, $NaNi_{0.45-x}Mn_{0.25}Ti_{0.3}Co_xO_2$ (0<x<0.45) and similar materials), sodium metal phosphates such as $NaMPO_4$ (M=Mn, Fe), $Na_xV_{1-y}M_y(PO_4)_3$ (M=Mn, Fe, Ni), $Na_3V_2O_{2x}(PO_4)_2F_{3-2x}$ (0≤x≤1), and $Na_2FeP_2O_7$. Some useful cathode materials for sodium batteries are described in Mukherjee et al., *Materials*, 2019: 12, 1952 (pages 1-52), which is incorporated herein by reference in its entirety.

As used herein, a structurally-integrated composite metal oxide is a material that includes domains (e.g., locally ordered, nano-sized or micro-sized domains) indicative of different metal oxide compositions having different crystalline forms (e.g., layered or spinel forms) within a single particle of the composite metal oxide, in which the domains share substantially the same oxygen lattice and differ from each other by the elemental and spatial distribution of metal ions in the overall metal oxide structure. Structurally-integrated composite metal oxides are different from and generally have different properties than mere mixtures of two or more metal oxide components (for example, mere mixtures do not share a common oxygen lattice).

Positive electrodes typically are formed by combining a powdered mixture of the active material and some form of carbon (e.g., carbon black, graphite, or activated carbon) with a binder such as (polyvinylidene difluoride (PVDF), carboxymethylcellulose, and the like) in a solvent (e.g., N-methylpyrrolidone (NMP) or water) and the resulting mixture is coated on a conductive current collector (e.g., aluminum foil) and dried to remove solvent and form an active layer on the current collector.

The negative electrodes also typically will include some form of carbon (e.g., carbon black, graphite, or activated carbon) in combination with the Pb—O—C nanocomposite materials described herein. The carbon is mixed with the active nanocomposite and a binder such as (polyvinylidene difluoride (PVDF), carboxymethyl cellulose, and the like) in a solvent (e.g., NMP or water) and the resulting mixture is coated on a conductive current collector (e.g., copper foil) and dried to remove solvent and form an active layer on the current collector.

The following non-limiting Examples are provided to illustrate certain features of the compositions and methods described herein.

Example 1. Preparation of Pb—O—C Nanocomposites

A series of Pb—O—C nanocomposites were synthesized using a high-energy SPEX ball mill. Mixtures of PbO and carbon black (SUPER P) or $Pb_3O_4$ and carbon black (SUPER P) in 7:3 PbOx:C weight ratios (about 4 grams per sample) were sealed in a stainless steel jar (35 mL) containing about 40 grams of stainless steel balls (¼ inch in diameter) under an inert atmosphere (Ar), and were shaken in a high-energy SPEX 8000M ball mill for 6 hours (h) at 1060 cpm (cycle per minute). The jars were loaded at room temperature, however some heating occurs naturally during the ball milling.

Figure 1:
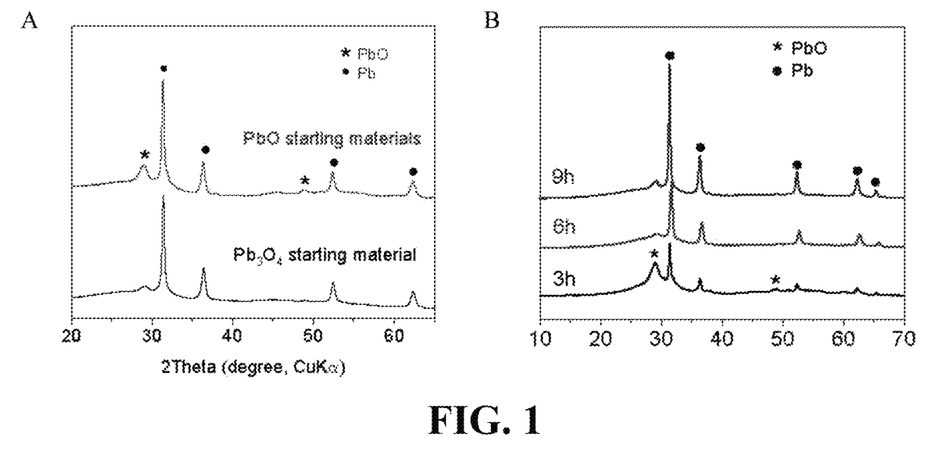
FIG. 1 shows X-ray diffraction (XRD) patterns for a Pb—O—C composite materials; Panel (a) shows XRD patterns for nanocomposites made from made from (a) PbO (top spectrum) and Pb$_3$O$_4$ (bottom spectrum) as the lead oxide source for the ball milling process; Panel (b) shows the effects of milling time for a nanocomposites formed from PbO as the lead oxide source; the positions of peaks corresponding to metallic Pb and PbO phases are marked with dots and asterisks, respectively.

FIG. 1 shows X-ray diffraction patterns for Pb—O—C composite materials synthesized by the above described synthesis method. Panel (a) shows X-ray diffraction patterns for nanocomposites made from PbO (top spectrum) and $Pb_3O_4$ (bottom spectrum) as the lead oxide source for the ball milling process. Panel (b) shows the effects of milling time for nanocomposites formed from PbO as the lead oxide source. The positions of peaks corresponding to metallic Pb and PbO phases are marked with dots and asterisks, respectively. The carbon phase is also evident as broad background hump in the 2-theta (2θ) range between about 25 and 30 degrees. The metallic Pb phase is formed by a reduction reaction of the PbOx starting material and carbon precursor materials during the high-energy ball milling process. PbO and $Pb_3O_4$ starting materials produce different ratios of PbOx to metallic Pb in the nanocomposites. As ball milling time increases, the fractional amounts of metallic Pb increases. Nanoparticle aggregation also increases with milling time.

Figure 2A:
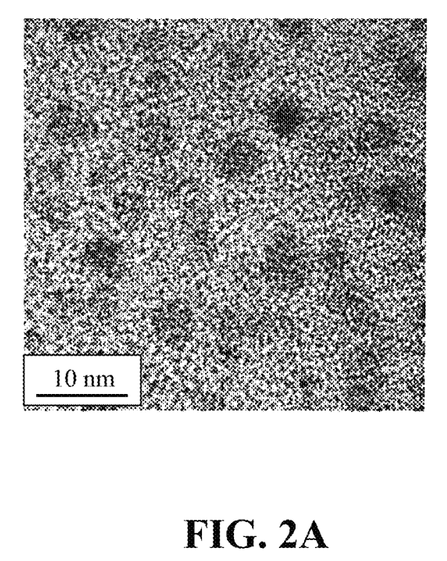
FIG. 2A shows a transmission electron microscopy (TEM) image of Pb and PbOx nanoparticles (darker regions) uniformly embedded in the matrix of carbon nanoparticles (surrounding lighter background).

The morphology of Pb—O—C composite samples have been analyzed by transmission electron microscopy (TEM). FIG. 2A shows a TEM image of Pb and PbOx nanoparticles (darker regions) uniformly embedded in the matrix of carbon nanoparticles (lighter surrounding background). This unique nanoscale composite morphology is advantageous in dissipating electrochemically-induced strain during the reversible alloying and conversion reactions of Pb and PbOx with Li or Na in a lithium or sodium cell during charging and discharging. The nanocarbon matrix can also act as a deformation buffer for the large volume expansion of Pb and PbOx active materials during charging and discharging, thus maintaining the electrical connectivity of the particles.

Energy-dispersive X-ray spectroscopy (EDS) mapping was used to confirm the distribution of Pb, O, and C within the nanocomposite.

The Pb nanoparticles can react with air to oxidize the particle surface and this process can be accelerated by heating the powder or an electrode laminate in air. The oxidation of the surface of the nanoparticles results in an exterior shell of PbOx. The presence of the PbOx is observed in the XRD pattern (stars markers) given in FIG. 2B, Panel A in which the growing diffraction peaks arise from increasing PbOx in the sample. Since this oxidation of the Pb nanoparticles to PbOx is self-limiting, we refer to this configuration as core Pb with shell of PbOx on the surface or PbOx@Pb.

Figure 2B:
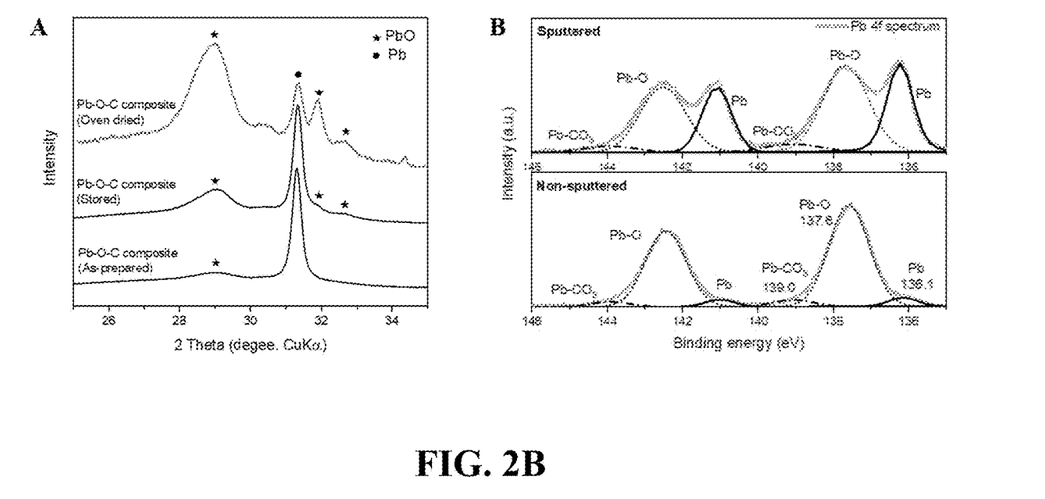
FIG. 2B shows (A) the XRD patterns of the shell on core PbOx@Pb nanoparticle over time wherein the Pb, post high-energy ball milling, is reacted with oxygen in the atmosphere to form the PbOx shell; and (B) the X-ray Photoelectron Spectroscopy (XPS) spectrum of the shell on core PbOx@Pb nanoparticle (a) before ion-gun sputtering and (b) after ion-gun sputtering for two minutes.

The example of shell on core PbOx@Pb is further demonstrated in FIG. 2B, Panel B in which the X-ray Photoelectron Spectroscopy which was conducted on the sample is shown. Importantly, the Pb oxide shifted Pb $4f$ signal is present at the beginning indicating the presence of oxide exterior shell, then, as the sputtering of the surface is conducted (upper data), then the Pb $4f$ signal from PbOx disappears and that of metallic Pb is maximally present thus indicating, again, a self-limited shell of PbOx on the surfaces.

Example 2. Electrochemical Evaluation of Pb—O—C Nanocomposites in Lithium and Sodium Cells Electrodes were prepared from the nanocomposite samples of Example 1 and commercial PbO and $Pb_3O_4$ by combining the Active material, i.e., Pb—O—C nanocomposite or commercial PbOx (as comparison examples) with SUPER-P carbon black and PVDF binder in the weight ratios of Active:C:PVDF shown in Table 1, and coating the resulting mixtures on a Cu current collector at a coating level of about 300 g/m², followed by drying at 75° C., for 12 hours. Another comparison electrode was prepared without any (see last entry in Table 1).

TABLE 1

| Active Compound | Electrode Laminate |
| --- | --- |
| Pb—O—C #1 (from PbO) | Active:Carbon:PVDF = 8:1:1 (w/w/w) |
| Pb—O—C #2 (from $Pb_3O_4$) | Active:Carbon:PVDF = 8:1:1 (w/w/w) |
| Commercial PbO | Active:Carbon:PVDF = 7:2:1 (w/w/w) |
| Commercial $Pb_3O_4$ | Active:Carbon:PVDF = 7:2:1 (w/w/w) |
| SUPER-P Carbon Black | Carbon:PVDF = 9:1 (w/w) |

Figure 3:
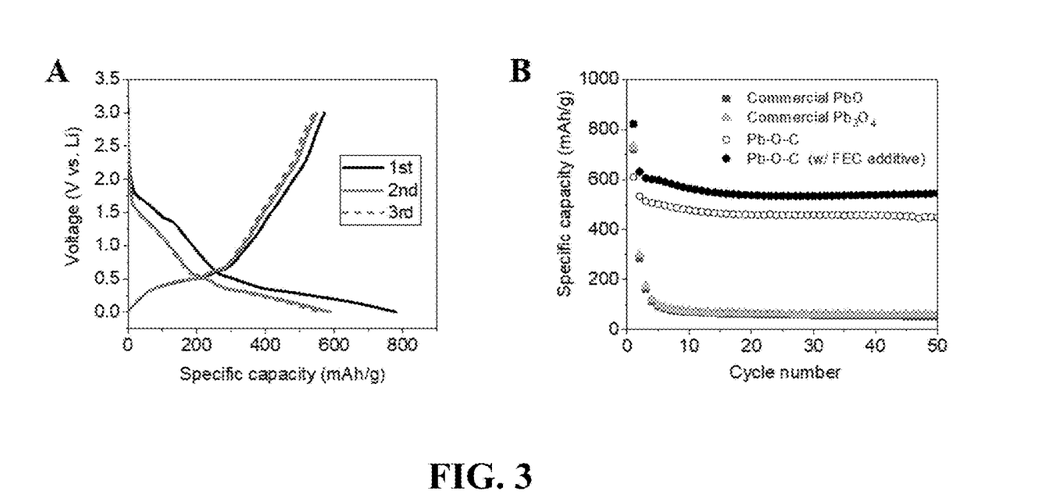
FIG. 3 shows electrochemical evaluations of a Pb—O—C nanocomposite in a sodium cell including (A) plots of initial voltage profiles (voltage versus specific capacity for the first three cycles); and (B) plots of specific capacity versus cycle number.

A nanocomposite from Example 1 (Pb—O—C #1) was cycle tested in a lithium half-cell with Li metal as counter electrode (CE) and the Pb—O—C nanocomposite electrode as the working electrode (WE). The electrolytes used in these evaluations were a solutions of 1.2 M $LiPF_6$ dissolved in a mixture solvent of ethylene carbonate (EC) and ethyl methyl carbonate (EMC), with or without about 10 wt % FEC as an additive. The initial charge-discharge curves for a Pb—O—C nanocomposite prepared from PbO as the PbOx starting material is shown in FIG. 3, Panel A for the cell utilizing the electrolyte without FEC. The cycling performance for the same nanocomposite is shown in FIG. 3, Panel B, with and without FEC additive, compared with conventional PbO-based and $Pb_3O_4$-based electrodes. The cycling performance of the nanocomposite (about 430 mAh/g) was far superior to the conventional electrodes (less than 50 mAh/g steady state discharge capacity). Addition of FEC provides a significant increase in the steady state cycling performance, leading to a gravimetric capacity of about 500 mAh/g.

Figure 4:
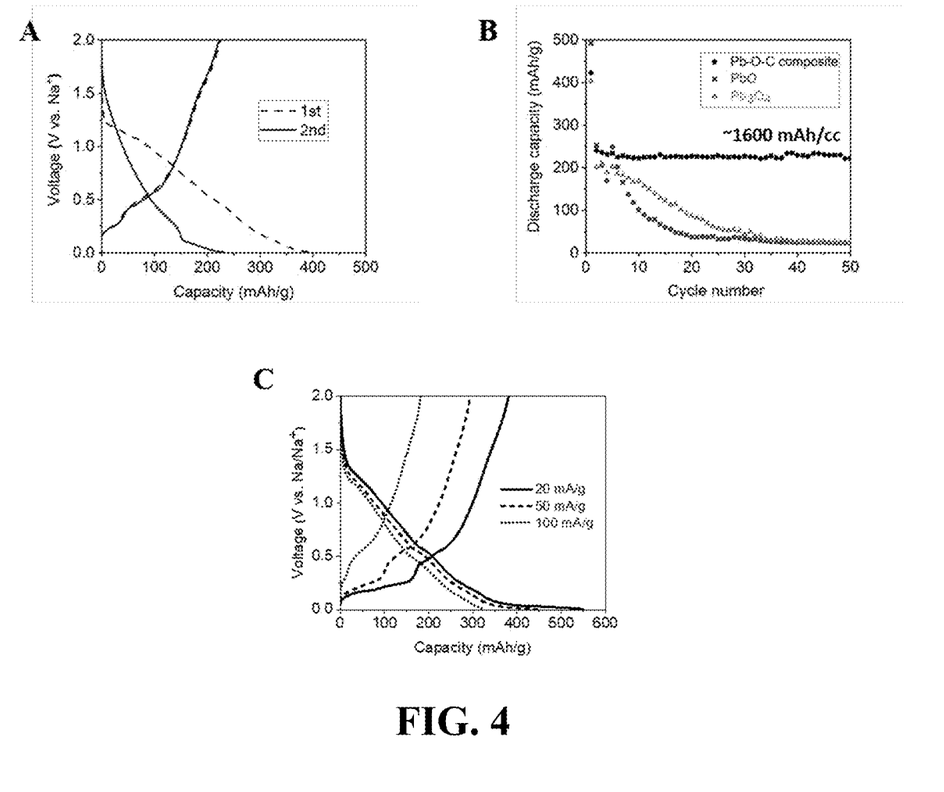
FIG. 4 shows electrochemical evaluations of a Pb—O—C nanocomposite in a sodium cell including (A) plots of initial voltage profiles (voltage versus specific capacity for the first two cycles); and (B) plots of specific capacity versus cycle number.

A nanocomposite Pb—O—C #1 from Example 1 also was cycle tested in a sodium half-cell with Na metal as counter electrode (CE) and the Pb/Pb-oxide/C nanocomposite electrode as the working electrode (WE). The electrolyte was a solution of 1M $NaPF_6$ dissolved in a mixture solvent of EC and diethyl carbonate (DEC) with 2 wt % FEC as an additive. The initial charge-discharge curves for a Pb—O—C nanocomposite prepared from PbO as the PbOx starting material is shown in FIG. 4, Panel A. The cycling performance for the same nanocomposite is shown in FIG. 4, Panel B, compared with conventional PbO-based and $Pb_3O_4$-based electrodes. The cycling performance of the nanocomposite, with a steady state specific discharge capacity between 200 and 240 mAh/g, which is surprisingly far superior to the conventional electrodes (about 50 mAh/g steady state discharge capacity). Because of the high mass per volume density of the Pb—O—C nanocomposite, this electrode provided about 1600 mAh/cm³ volumetric energy density, which is greater than the volumetric energy density of graphite (600 mAh/cm³ in a lithium cell), and approaches the volumetric energy density of Si (2200 mAh/cm³ in a lithium cell). It is believed that pre-sodiation of the Pb—O—C nanocomposite could ameliorate the observed first cycle irreversible capacity loss (ICL) of approximately 43%.

Example 3. Preparation of $Pb_yM_{(1-y)}$-O—C Nanocomposites $Pb_yM_{(1-y)}$-O—C(0<y<1) nanocomposite materials containing one or two additional elements were prepared by grinding a mixture of PbOx, carbon, and either a material containing a single additional element ($Mn_2O_3$, NiO, $Fe_2O_3$, Sb, SnO, or Sn), or a material containing two additional elements (SbNi or SnSb). Lead oxide (PbO) and a metal oxide containing a single additional element (MOx) (7:3 Pb:M molar ratio) were mixed with carbon black in a 7:3 weight ratio of the Pb/M oxides to carbon (about 4 g per sample) in stainless steel jars 35 mL filled under an inert atmosphere (Ar) and shaken in a high-energy ball mill for 6 h at 1060 cpm. Similarly, mixtures of lead oxide (PbO) and oxides of two additional elements (M and M') having the molar ratio of 2:1:1 (Pb:M:M') were mixed with carbon black in a 7:3 (PbMM'Ox:C) weight ratio (about 4 g per sample) in 35 mL stainless steel jars filled under an inert Ar atmosphere and shaken in a high-energy ball mill for 6 h at 1060 cpm.

Figure 5:
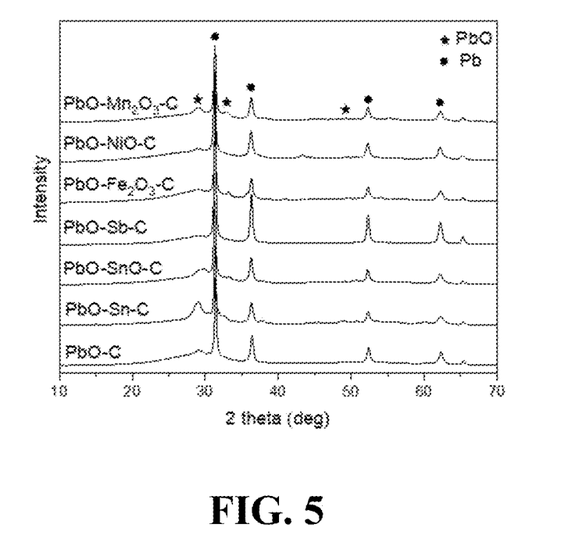
FIG. 5 shows X-ray diffraction (XRD) patterns for a Pb—O—C nanocomposite materials prepared by grinding a mixture of PbOx, carbon, and a material containing an additional element (Mn$_2$O$_3$, NiO, Fe$_2$O$_3$, Sb, SnO, and Sn) in a high-energy ball mill (i.e., Pb$_y$M$_{1-y}$-O—C nanocomposites), compared to a Pb—O—C nanocomposite material prepared from PbOx and carbon, alone, with no additional element included.

FIG. 5 shows X-ray diffraction (XRD) patterns for the $Pb_yM_{(1-y)}$-O—C nanocomposite materials containing one additional element described above, compared to a Pb—O—C nanocomposite material prepared from PbOx and carbon, alone. The spectra in FIG. 5 show that the additional materials react well with the PbOx material forming the PbM alloy phase and PbMOx compounds.

Figure 6:
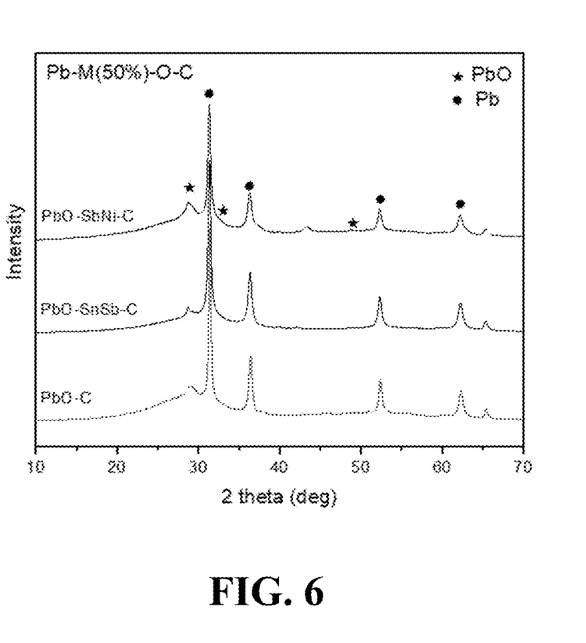
FIG. 6 shows X-ray diffraction (XRD) patterns for a Pb—O—C nanocomposite materials prepared by grinding a mixture of PbOx, carbon, and a material containing two additional elements (SbNi and SnSb) in a high-energy ball mill, compared to a Pb—O—C nanocomposite material prepared from PbOx and carbon, alone, with no additional elements included.

FIG. 6 shows X-ray diffraction (XRD) patterns for the $Pb_yM_{(1-y)}$-O—C nanocomposite materials containing two additional elements (Sb—Ni or Sn—Sb) described above, compared to a Pb—O—C nanocomposite material prepared from PbOx and carbon, alone. The spectra in FIG. 6 show that the two additional elements react well with the PbOx material forming a PbMM' alloy phase and PbMM'Ox compounds.

Example 4. Electrochemical Evaluation of $Pb_yM_{(1-y)}$-O—C Nanocomposites in Lithium and Sodium Cells Electrodes were prepared from the $Pb_yM_{(1-y)}$-O—C nanocomposite samples of Example 3 by combining the nanocomposite with SUPER-P carbon black and PVDF binder in the weight ratios of nanocomposite:C:PVDF of 8:1:2, and coating the resulting mixtures on a Cu current collector at a coating level of about 300 g/m², followed by drying at 75° C., for 12 hours.

The electrodes were evaluated in lithium and sodium half-cells cycled at room temperature in the voltage range between 0.005-3.0 V vs Li and 0.005-2.0 vs Na, respectively. The applied current density was 100 mA/g. The electrolytes used in these evaluations were solutions of 1.2 M $LiPF_6$ in EC/EMC (3:7 weigh ratio) with 10 wt % FEC for Li cells and 1 M $NaPF_6$ in EC/DEC (1:1 volume ratio) with 2 wt % FEC for sodium cells.

Figure 7:
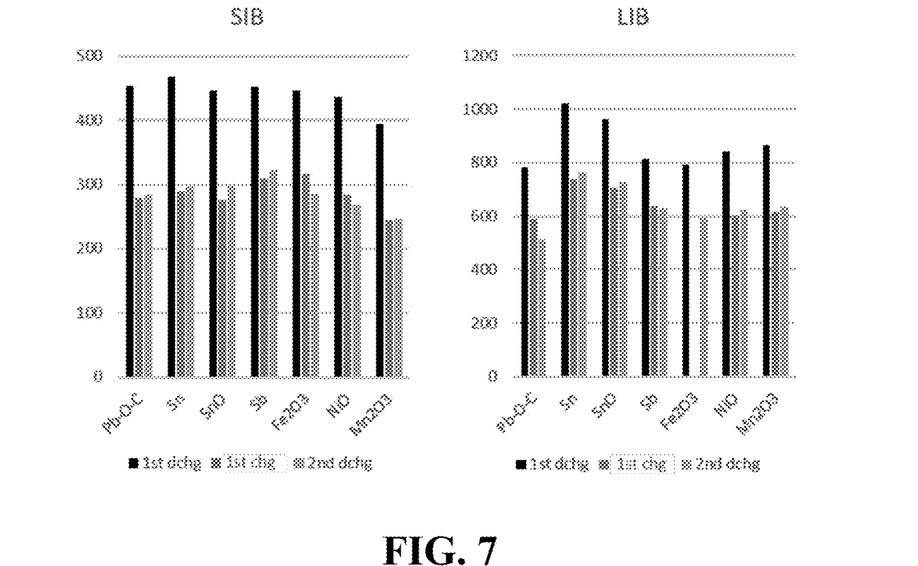
FIG. 7 shows initial discharge capacities, first charge capacities, and second discharge capacity (mAh/g) for the nanocomposites of FIG. 5 is sodium (SIB) and lithium (LIB) cells.

FIG. 7 shows initial specific capacity (mAh/g), and capacities for the subsequent cycle for the nanocomposites of FIG. 5 in sodium (SIB) and lithium (LIB) cells. The results in FIG. 7 show improved specific capacity and decreased initial irreversibility with the addition of a second element to the PbOx nanocomposite.

Figure 8A:
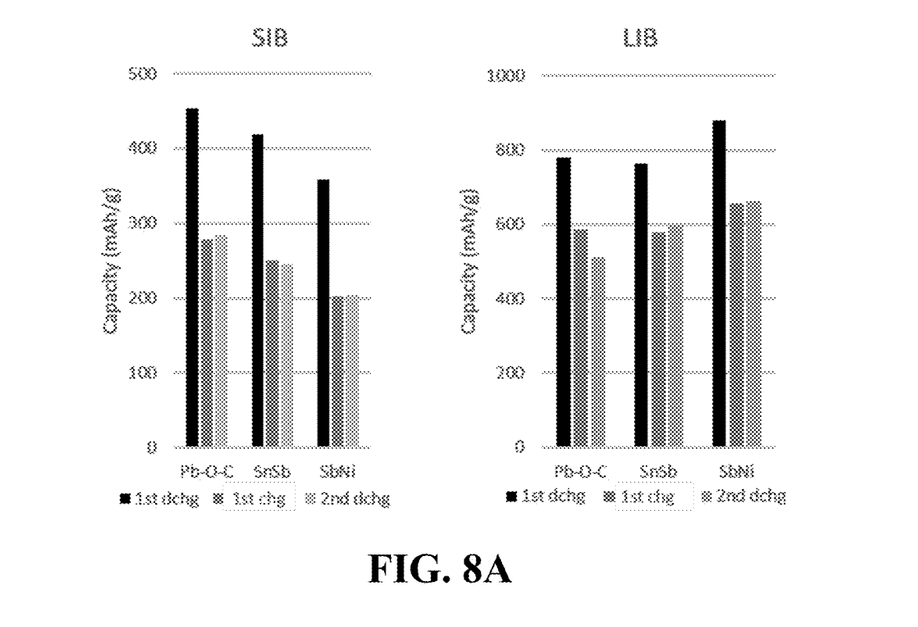
FIG. 8A shows initial discharge capacities, first charge capacities, and second discharge capacity (mAh/g) for the nanocomposites of FIG. 6 in sodium (SIB) and lithium (LIB) cells.

FIG. 8A shows initial specific capacity (mAh/g), and capacities for the subsequent cycle for the nanocomposites of FIG. 6. The results in FIG. 8A show comparison between Pb—O—C with PbMM'-O—C in Li cells (LIB) and Na cells (SIB). Cycling performance can be expected to be better from buffering effect of additional materials, even if capacity in Na cell was slightly decreased due to inactive elements. Capacity of Li cells using Pb-M-M'-O—C were increased compared to Pb—O—C.

Figure 8B:
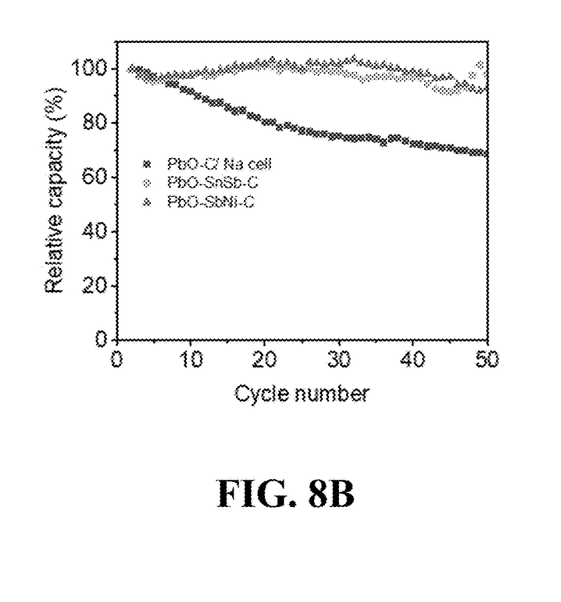
FIG. 8B shows plots of discharge capacities versus the number of cycles, normalized initially to 100%, for sodium cells comprising the nanocomposites represented in FIG. 6.

FIG. 8B shows plots of discharge capacities versus the number of cycles, normalized initially to 100%, for sodium cells comprising the nanocomposites represented in FIG. 6. The addition of SbSn and SbNi improved the capacity retention significantly relative to the Pb—O—C example without any additional elements.

Example 5. Electrochemical Cells and Batteries

Figure 9:
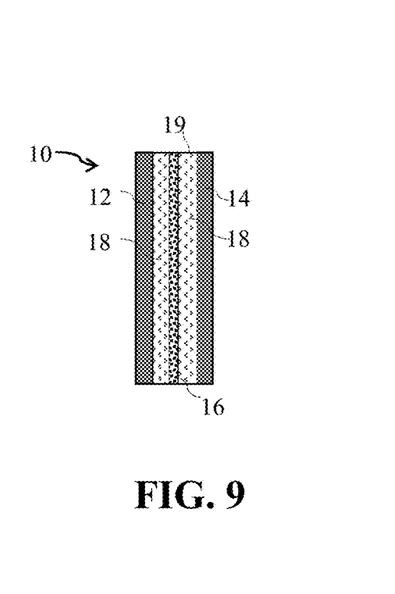
FIG. 9 depicts a schematic representation of an electrochemical cell.
Figure 10:
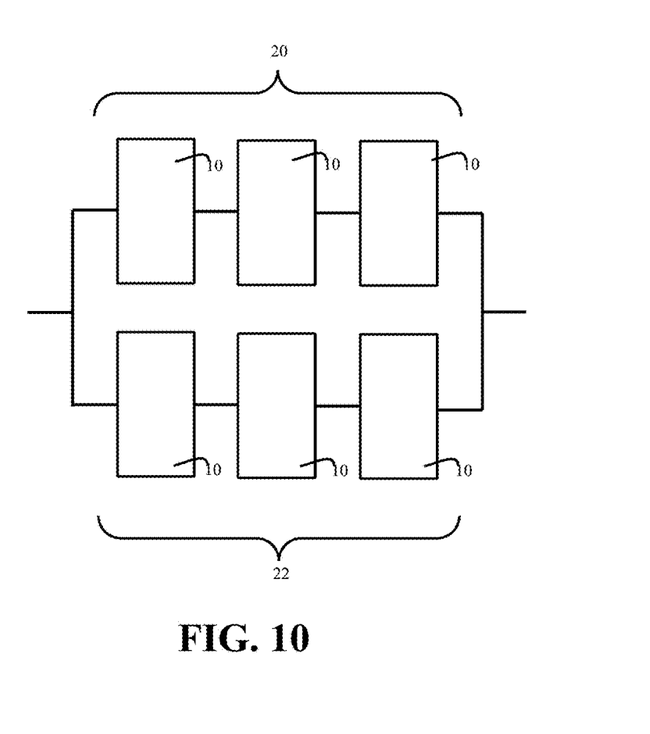
FIG. 10 depicts a schematic representation of a battery consisting of a plurality of cells connected electrically in series and in parallel.

FIG. 9 schematically illustrates a cross-sectional view of an electrochemical cell 10 comprising electrode 12, and electrode 14 comprising a Pb—O—C nanocomposite as described herein, with separator 16 therebetween. A sodium-containing or lithium-containing electrolyte 18, comprising a solution of a sodium or lithium salt in a non-aqueous solvent, contacts electrodes 12 and 14 and separator 16. The electrodes, separator and electrolyte are sealed within housing 19. FIG. 10 schematically illustrates a sodium-ion or lithium-ion battery comprising a first array 20 consisting of three series-connected electrochemical cells 10, and a second array 22 consisting of three series-connected electrochemical cells 10, in which first array 20 is electrically connected to second array 22 in parallel.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of preparing a nanocomposite comprising lead (Pb) nanoparticles and lead oxide nanoparticles homogeneously dispersed in a matrix of carbon nanoparticles; the method comprising: grinding a mixture comprising a lead oxide material and a carbon material together in a high-energy ball mill, under an inert atmosphere to form the carbon nanoparticles, the lead oxide nanoparticles, and reduce a portion of the lead oxide to elemental Pb nanoparticles; wherein the ball milling is continued until a homogeneous dispersion of the Pb nanoparticles and lead oxide nanoparticles in the matrix of carbon nanoparticles is formed.

2. The method of claim 1, wherein the lead oxide material and the carbon material are initially present in the ball mill in a respective weight ratio of about 9:1 to 1:1.

3. The method of claim 1, wherein the ball milling is continued until the Pb nanoparticles have a mean diameter of 2 to 20 nm as determined by electron microscopy.

4. The method of claim 1, wherein the ball milling is continued until the lead oxide nanoparticles have a mean diameter of 2 to 20 nm as determined by electron microscopy.

5. The method of claim 1, wherein the ball milling is continued until the carbon nanoparticles have a mean diameter of 10 to 200 nm as determined by electron microscopy.

6. The method of claim 1, wherein the lead oxide nanoparticles have a Pb:O atomic ratio of 1:1 to 1:2.

7. The method of claim 1, wherein the Pb and lead oxide are present in the nanocomposite in a respective molar ratio of 1:0.1 to 0.1:1.

8. The method of claim 1, wherein lead oxide is present on the surface of at least some of the Pb nanoparticles.

9. The method of claim 1, wherein lead oxide material comprises at least one material selected from the group consisting of $PbO$, $PbO_2$, and $Pb_3O_4$.

10. The method of claim 1, wherein carbon material comprises at least one material selected from the group consisting of carbon black, hard carbon, and graphite.

11. The method of claim 1, further comprising heating the so-formed homogeneous dispersion of the Pb nanoparticles and lead oxide nanoparticles in the matrix of carbon nanoparticles in air at a temperature of 30 to 200° C. so as to oxidize the surface of the Pb nanoparticles to form lead oxide-coated Pb nanoparticles.

12. A method of preparing a nanocomposite comprising lead (Pb) nanoparticles and lead oxide nanoparticles homogeneously dispersed in a matrix of carbon nanoparticles; the method comprising: grinding a mixture comprising a lead oxide material and a carbon material together in a high-energy ball mill, under an inert atmosphere to form the carbon nanoparticles, the lead oxide nanoparticles, and reduce a portion of the lead oxide to elemental Pb nanoparticles; wherein the ball milling is continued until a homogeneous dispersion of the Pb nanoparticles and lead oxide nanoparticles in the matrix of carbon nanoparticles is formed, wherein the mixture of the lead oxide material and the carbon material further comprises at least one additional element selected from the group consisting of a transition metal, Al, Si, P, Sn, Sb, and Bi.

13. The method of claim 12, wherein the at least one additional element is (a) incorporated within the Pb nanoparticles, (b) incorporated as an oxide within the of lead oxide nanoparticles, (c) dispersed within the matrix of carbon nanoparticles as elemental nanoparticles, (d) dispersed within the matrix of carbon nanoparticles as oxide nanoparticles, or (e) a combination of two or more of (a), (b), (c), and (d).

14. The method of claim 12, wherein the at least one additional element is selected from the group consisting of Mn, Ni, Fe, Sb, and Sn.

15. The method of claim 12, wherein the at least one additional element comprises a combination of Sb and Sn, or a combination of Sb and Ni.

16. The method of claim 12, wherein the at least one additional element is present in the nanocomposite at a concentration of 50% to 100% expressed as a percentage of the Pb in the nanocomposite.

17. The method of claim 12, wherein lead oxide material comprises at least one material selected from the group consisting of $PbO$, $PbO_2$, and $Pb_3O_4$.

18. The method of claim 12, wherein carbon material comprises at least one material selected from the group consisting of carbon black, hard carbon, and graphite.

19. The method of claim 12, wherein the ball milling is continued until the carbon nanoparticles have a mean diameter of 10 to 200 nm, the Pb nanoparticles have a mean diameter of 2 to 20 nm, and the lead oxide nanoparticles have a mean diameter of 2 to 20 nm, as determined by electron microscopy.

20. The method of claim 12, further comprising heating the so-formed homogeneous dispersion of the Pb nanoparticles and lead oxide nanoparticles in the matrix of carbon nanoparticles in air at a temperature of 30 to 200° C. so as to oxidize the surface of the Pb nanoparticles to form lead oxide-coated Pb nanoparticles.

\* \* \* \* \*